United States Patent Office 3,406,195
Patented Oct. 15, 1968

3,406,195
ALPHA-CHLORO-ALPHA-THYMOXY-
PROPIONIC ACID
Richard G. Taylor, Reeds Spring, Mo., assignor to CDC Industries, Inc., Springfield, Mo., a corporation of Missouri
No Drawing. Filed Feb. 5, 1965, Ser. No. 430,733
1 Claim. (Cl. 260—521)

ABSTRACT OF THE DISCLOSURE

Alpha-chloro-alpha-thymoxy propionic acid is prepared by reacting either aluminum or magnesium thymate with a dihalopropionic acid, with yields of 70–90%. The product exhibits bacteriostatic activity.

---

This invention relates generally to new compositions of matter and processes for making them. More particularly, the present invention relates to aryloxy haloaliphatic acids, together with their salts and esters, and to a novel method of producing these compounds.

As was stated in my prior U.S. Patent No. 2,793,230, issued May 21, 1957, the older idea of microbiological inhibition and destruction was that of bactericidal action. The phenols and cresols were considered to be excellent bactericidal agents because of their effectiveness as protoplasmic poisons. Prior concepts of bactericidal activity have, however, been rather generally superceded by the principle of bacteriostatic activity wherein it is understood that bacteriostatic substances alter the enzyme systems, as well as the normal pattern of the enzyme sequence of the microorganisms to produce inhibition to growth and reproduction of the organisms.

It is, therefore, an object of this invention to provide new biostatic agents having wide spectrums.

It may be said that the successful design of biologically active molecules involves such factors as molecular shape, stereochemical properties, and physicochemical properties such as solubility, vapor pressure and surface tension. The ether linkage provides a valency angle which lends a V shape to the molecule. The oxygen in the ether linkage, having two lone pairs of electrons, provides for polar molecules that may be hydrogen-bonded. These phenomena permit differential solubilities and partition coefficients. Such molecules may orientate themselves in such a manner as to affect either enzyme or metabolite systems. A good biostatic agent should possess these properties and it is another object of this invention to provide such chemical compositions.

The present status of the field of microbiology is such that many commercial and/or industrial plants that process a great variety of commodities are faced with serious problems of preventing contamination of their products with microorganisms. Contamination is a loss to the producer and a danger to the consumer. These problems in microbiological engineering require new and different technique together with more efficient biostatic agents that are adaptable to this type of engineering. It is another object of this invention to provide biostatic agents that are effective and adaptable to problems in microbiological engineering.

It is also an object of the present invention to provide a process for producing an aryloxy haloaliphatic acid and the products so produced.

Another object of the present invention is the provision of new fungicide compounds using the alphaaryloxy alphahaloaliphatic acids.

Other objects and advantages of the present invention will become apparent to those skilled in the art from the following description.

Ether acids are well known in the prior art. For example, U.S. Patent No. 2,516,611, to Berhenke, discloses a method of producing aryloxy aliphatic carboxylic acids by a reaction between salts or phenol and a saturated chloroaliphatic carboxylic acid. Also, ether acids of the halogenated aryloxy aliphatic acids are known in the art. Further, my prior U.S. Patent No. 2,793,230 sets forth a method for producing aryloxy dihaloaliphatic acids through the use of calcium oxide, alcohol and trichloro acetic acid, but is necessarily limited to the dihalo compounds and the acetic acid derivative. Other methods have been known in the art which utilize metallic sodium as a reactant, sometimes resulting in violent and dangerous reaction rates.

One aspect of the present invention briefly may be described as a process for producing aryloxy haloaliphatic acids through the initial formation of a metal alcoholate, the metal alcoholate being formed by the reaction between a metal amalgam and an aliphatic alcohol, and in turn the metal alcoholate is reacted with an arylhydroxide to produce a metal oxyaryl compound. The latter may be reacted with an aliphatic dihaloaliphatic acid to produce the aryloxy haloaliphatic acid.

Another aspect of the present invention includes new compounds having the following formula:

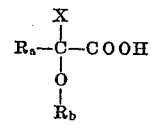

wherein X is selected from the group consisting of chlorine, bromine, and iodine; $R_a$ is an alkyl radical having from 1 to 20 carbons, and $R_b$ is an aryl radical selected from the group consisting of:

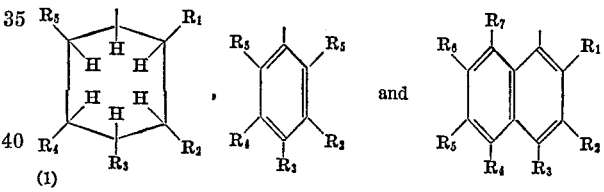

wherein $R_1$–$R_7$ are selected from the group consisting of halogen, nitro, hydrogen, hydroxy, alkoxy, —CN, —CHO, carboxy, alkyl; amino, and aryl; (2) cholesteryl; (3) cholyl, and (4) —$C_6H_4$—$C_2H_3(NH_2)$·(COOH).

It has been found that the reaction of a metal amalgam with an aliphatic alcohol to produce a metal alcoholate as a first step in the production of aryloxy haloaliphatic acid has the unique advantage of (a) preventing fire hazards; (b) producing compounds having high boiling points; (c) normally results in a final production which is clear, and (d) substantially increases the yield of the aryloxy haloaliphatic acid. Further, the method will produce a group of novel compounds, particularly compounds such as thymoxy alphachloropropionic acid and phenoxy alphachloropropionic acid, which have been found to exhibit unique biostatic activity.

It has also been found that any amalgam can be used to react with aliphatic alcohol, and therefore it can be broadly stated that any metal which will form an amalgam with mercury is suitable, according to the present invention. Among those metals which have been found acceptable are included—but by no means limited to—the following: aluminum, magnesium, silver, lead, nickel, zinc, copper, sodium, potassium, lithium, calcium, strontium, and barium. The amalgam is produced in any conventional manner and contains approximately 1 to 2% mercury, but may range between .1% and 5% mercury. It is preferred that the amalgam be formed with a finely divided metal, such as metal in the form of chips, shavings, or powder.

The alcohol that is to be reacted with the amalgam may be selected from a wide variety of aliphatic alcohols, among which are included methyl, ethyl n-propyl, isopropyl, n-butyl, isobutyl, tertiary butyl, n-amyl, isoamyl, tertiary amyl, etc. The present invention is not limited to the use of a particular aliphatic alcohol; however, for convenience the lower molecular weight alcohols are preferred, since they have the greater solvent effect, particularly in water. Among those higher alcohols which may be used are hexanol, heptanol, and octanol.

The quantities of the reactants used to form the metal alcoholate depend, of course, on the valency of the reactive metal of the amalgam. For example, with aluminum and magnesium, which are trivalent and divalent, respectively, 1 mol of each metal will react respectively with 3 and 2 mols of alcohol, such as methanol or ethanol, etc. The amount of the alcohol to be used is not critical, but it is desirable to utilize a 20% to 40% excess of alcohol, in order to maintain a reaction product—the metal alcoholate—in solution. The reaction between the alcohol and the reactive metal in the amalgam is one that proceds smoothly under heat, as by refluxing, without the fire hazard or explosive reaction that sometimes accompanies the prior art efforts to produce an alcoholate.

The metal alcoholate, such as aluminum, magnesium, sodium, etc., is then reacted with an arylhydroxide. This term is intended to include the presence of at least one hydroxyl group in any unsaturated ring structure, such as the benzene ring, naphthyl ring, etc., and also the saturated 6 carbon ring present in cyclohexanol. Actually the arylhydroxide which may be used to react with the metal alcoholate is not all limited and may be broadly considered to be included within the following formulas:

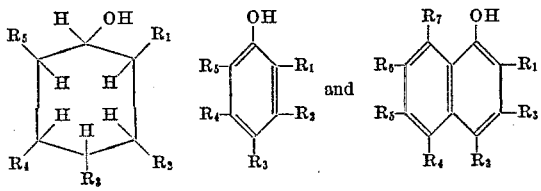

wherein $R_1$–$R_7$ are selected from the group consisting of halogen, nitro, hydrogen, hydroxy, alkoxy, —CN, —CHO, carboxy, alkyl, amino, and aryl, and also cholesterol, cholic acids and tyrosine.

Specifically included within this group are phenols, polyphenols, substituted phenols and compounds related to phenols, including, but not limited to, thymol, paratertiary butyl phenol, parasecondary butyl phenol, also ortho, metal, butyl phenols, paraamyl phenols, also ortho and meta amyl phenol, isopropyl phenols, and resorcinol 4-isopropyl ether, vanillin, ortho, meta and para cresol, resorcinol, the resorcyclic acids, alkyl methyl, ethyl, etc., substituted resorcinols (orcinols), methyl, ethyl, etc., substituted phenols, nitro phenol, halogenated (chlorine, bromine, iodine, fluorine) phenols, naphthols, gallic acids, tannic acids, salicyclic acid, amino salicyclic acid, cholesterol, cholic acids, nitro naphthols, amino naphthols, tyrosine, methyl salicilate, salol, nitrosalicyclic acids, guaiacol, phloroglucinol, catechol, and 8-hydroxyquinoline. Additionally, menthol, a saturated alkyl substituted hexanol, has been found useful, but is not preferred to the exent as that of the compounds having unsaturated ring structure, particularly those related to phenol.

Selection of the desired arylhydroxide, which is to form a part of the aryloxy haloaliphatic acid, usually depends upon the biological activity sought. Alkyl groups, for example, improve the solubility and surface activity of the product, and particularly methyl groups seem to be more chemically active. Longer alkyl chains tend to simulate additional ring structure and have been known to increase bactericidal and/or fungicidal activity as the length of the alkyl chain attached to a ring system such as phenol is increased. Maximum activity has generally been found when alkyl chains of 3 to 6 carbon atoms are attached to the unsaturated ring. With the same number of carbon atoms in the alkyl chain, the effectiveness of the resulting compound decreases in the following order of attachment of the chain to the unsaturated ring: primary, also, secondary, and tertiary.

Additionally, attached ether linkages supply a valency angle nearly the same as a carbon to carbon link, and therefore the ether oxygen is found to exhibit polar properties, thereby increasing biological activity. Carboxylic acid groups improve the solubilizing characteristics, although the biological activity of the compound may be increased or decreased as a result of the addition of the carboxylic acid group. Halogens also are known to improve the biological acticity.

The metal oxyaryl compound resulting from the reaction between the alcoholate and arylhydroxide compound or phenolic compound is produced smoothly and safely, since the reaction is generally fairly slow. One of the notable advantages of the present invention is the fact that the reactant aliphatic alcohol is recovered, since it is reformed by the reaction of the metal alcoholate with the arylhydroxide. This is a significant advantage which enables the process to be exceptionally economical on a commercial scale.

In order to produce the aryloxy haloaliphatic acid, the metal aryloxy compound is reacted with a dihaloaliphatic acid. Any dihaloaliphatic acid having at least 3 carbon atoms has been found to be suitable. The halogens are preferably attached at the alpha carbon position; however, the halogen atoms may be positioned at the beta, gamma, delta . . . or omega position. Or, there may be one alpha halogen, and one or more beta, gamma, delta . . . or omega halogens. Among those halogens which are suitable are the chlorine, bromine and iodine.

The following examples illustrate the process of the present invention.

EXAMPLE 1

3 mols plus 10% excess of dry isopropyl alcohol are refluxed with 1 mol of aluminum powder mixed with 1% mercury or enough mercuric salt to form an amalgam. After about 3–5 hours time, refluxing any unreacted amalgam can be filtered off, since it is insoluble in the alcohol. The aluminum isopropylate is refluxed with 3 mols of thymol in an alcoholic slurry for 3 to 6 hours at a temperature of approximately the boiling point of isopropyl alcohol (82° C.) which will release the isopropyl alcohol for reuse and form aluminum thymate. 3 mols of dichloropropionic acid in an alcoholic solution or slurry is added with stirring to the aluminum thymate. The addition is continued for about 2 to 4 hours. After all the alpha, alpha dichloropropionic acid is added, the reaction mixture is heated to reflux for 2 to 4 additional hours at a temperature of approximately 82° C. The pH of the reaction mixture after the addition of the acid should be between a pH of 8 and 11. The alpha thymoxy alpha-chloropropionic acid is recovered in good yield, approximately 70–90%. The product is an oily liquid ranging from honey-color to dark honey-color. When product is highly purified and cooled it may crystallize forming needle crystals of similar color to liquid state. Characteristic ethereal odor in all states. Boiling point of oily liquid has range of 205° C. to 212° C. Sp. gr. of 1.089±25°/20°.

EXAMPLE 2

The process of Example 1 was followed, with the exception that 1 molecular weight of sodium is mixed with 1% mercury to form sodium amalgam, and phenol was substituted for the thymol. The reaction produced a good yield of a phenoxy alphachloropropionic acid.

EXAMPLE 3

The process of Example 1 was followed, except that magnesium was substituted for aluminum, methyl alcohol for the isopropyl alcohol, and phenol for the thymol. The reaction product, phenoxy alphachloropropionic acid, was obtained in good yield.

EXAMPLE 4

The process of Example 1 was followed, except that magnesium was substituted for the aluminum to produce magnesium thymate. 1 mol of magnesium thymate was then reacted with 2 mols of alpha, alpha dichloropropionic acid to produce alphathymoxy alphachloropropionic acid.

EXAMPLE 5

Substitution of the dibromo or diiodo propionic acids for the dichloropropionic acid of Example 1 produced the corresponding alpha thymoxy alpha (iodo or bromo) propionic acid.

EXAMPLE 6

The process of Example 1 was followed, except that vanillin was substituted for thymol. The aluminum amalgam was reacted with n-amyl alcohol. A reaction produced aluminum amylate, which in turn reacted with the vanillin to produce aluminum vanillate. Aluminum vanillate was reacted with alpha, alpha dibromobutanoic acid to produce alpha vanillo alpha bromobutanoic acid.

EXAMPLE 7

Other aryloxy haloaliphatic acids were prepared by substituting alpha naphthol for the thymol in Example 1, and in turn reacting the naphthol with aluminum amalgam, and in turn reacting the product formed with alpha, alpha dichloropropionic acid. The alpha naphthoxy alpha chloropropionic acid was obtained in good yield.

EXAMPLE 8

The procedure of Example 1 was followed, except that paracresol was substituted for the thymol in the same molar quantities and produced the aluminum isocresylate. A 3 to 1 molar ratio of alpha, alpha bromopropionic acid was added to the alumino isocresylate to produce alpha cresylic alpha bromopropionic acid.

EXAMPLE 9

The procedure of Example 1 was followed, except that 3 mols of vanillin was used to substitute for the thymol and reacted with 1 mol of aluminum isopropylate to produce aluminum vanillate and reform the isopropyl alcohol. The aluminum vanillate was reacted with 3 times its molar quantity of alpha, alpha iodopropionic acid to produce the alpha vanillo alpha iodopropionic acid.

In all the foregoing examples the alcohol used to react with the reactive metal in the amalgam was recovered for reuse through the second step, wherein the metal alcoholate was reacted with the arylhydroxide. Thus there was found to be very little loss of the alcohol, since it could be continuously reused.

All of the above compounds were found to have biostatic acticity; however, it has been found that in particular the alpha-thymoxy alphachloropropionic acid and the alphaphenoxy alphachloropropionic acid are unique in their activity as shown by the following examples of the use of these compounds.

EXAMPLE 10

The paper-disc method of Kolmer was used in placing this example in use. One centimeter discs were treated with .1 cc. of a 1–100 dilution of the alpha thymoxy alpha chloropropionic acid. Plates of enriched agar were treated with 1 cc. of a 1–100 dilution of the appropriate organism. The Kolmer discs were properly spaced on the plate, and the plates were incubated at 37° C. for 48 hours. At the end of this incubation period the clear zone around each disc was measured and recorded.

| | Zone of inhibition, mm. |
|---|---|
| Staphyloccus aureus | 8 |
| Salmonella typhosa | 6 |
| Bacillus glovegii | 5 |
| Salmonella cholerasuis | 7 |
| Streptococcus pyogenes | 9 |
| Shigella paradyseuteriae | 10 |
| Pseudomonas spp. | 7 |
| Proteus spp. | 8 |
| Coliform spp. | 9 |
| Brucella spp. | 10 |
| Bacillus mesentericus | 6 |

EXAMPLE 11

The paper disc method was used in placing this example in use. One cm. discs were treated with .1 cc. of a 1–100 dilution of alpha phenoxy alpha chloropropionic acid. Plates of Sabourauds dextrose were treated with 1 cc. of a heavy suspension of 8 day cultures of the appropriate fungii. The discs were properly spaced on the plates, and the plates were incubated at room temperature for 7 days. At the end of this incubation period the zones of inhibition were measured and recorded.

| | Zone of inhibition, mm. |
|---|---|
| Verticillium spp. | 5 |
| Mucor spp. | 4 |
| Penicillium italicum | 7 |
| Aspergillus funigatus | 4 |
| Fusarium spp. | 4 |
| Trichophytom interdigitale | 6 |
| Rhizopus nigricans | 4 |
| Pseudomonas syringae | 5 |
| Alternaria spp. | 5 |
| Cephalosporium acromonum | 6 |
| Epidermophytum floccosum | 4 |
| Aspergillus oryzae | 7 |
| Ceratocystis ulmi | 8 |
| Monilia niger | 4 |
| Ustelago zeae | 3 |

From the foregoing detailed description, it will be evident that there are a number of changes, adaptations, and modifications of the present invention which come within the province of those skilled in the art; however, it is intended that all such variations not departing from the spirit of the invention be considered as within the scope thereof as limited solely by the appended claims.

I claim:

1. Alpha thymoxy alphachloro propionic acid.

References Cited

UNITED STATES PATENTS

| 2,000,329 | 5/1935 | Heisel et al. | |
| 2,240,275 | 4/1941 | Whitmore et al. | |
| 2,732,284 | 1/1956 | Sakowski. | |
| 2,793,230 | 5/1957 | Taylor. | |
| 2,830,083 | 4/1958 | Gilbert et al. | 260—521 |
| 2,857,261 | 10/1958 | Kosmin | 71—2.6 |

HENRY R. JILES, Primary Examiner.

D. STENZEL, Assistant Examiner.